Jan. 5, 1971 R. W. BERRY, JR 3,551,979
ROTARY CUTTING DEVICE WITH ADJUSTABLE BLADES
Filed Jan. 23, 1968
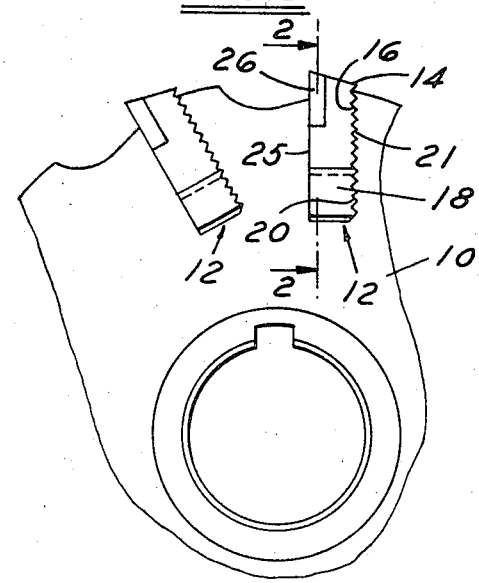
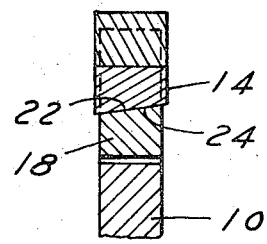
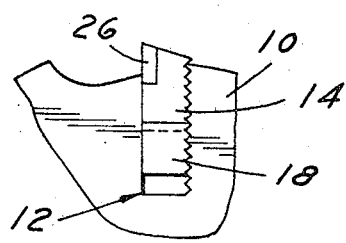
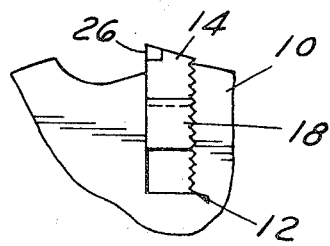
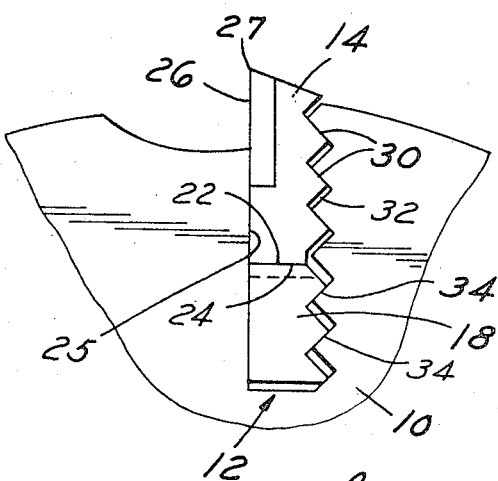
INVENTOR
ROBERT W. BERRY, JR.
BY
Barnes, Kisselle, Raisch & Choate
ATTORNEYS

United States Patent Office 3,551,979
Patented Jan. 5, 1971

3,551,979
ROTARY CUTTING DEVICE WITH ADJUSTABLE BLADES
Robert W. Berry, Jr., Ferndale, Mich., assignor to Fansteel Inc., Chicago, Ill., a corporation of New York
Filed Jan. 23, 1968, Ser. No. 699,966
Int. Cl. B26d 1/12
U.S. Cl. 29—105                                           3 Claims

ABSTRACT OF THE DISCLOSURE

This invention relates to improvements in rotary cutting devices and more particularly to rotary cutting devices in which the tool carriers are radially and axially adjustable by combining a serrated blade and a serrated wedge for simultaneous assembly in any of a plurality of positions in the main body of the device.

BACKGROUND OF THE INVENTION

This invention relates to improvements in rotary cutting devices and more particularly to a device in which the cutting blades are adjustable.

Briefly, this invention provides a rotary tool cutter in which the tool carriers can be adjusted both radially and axially. A wedge containing a plurality of serrated teeth is used to force serrated teeth of the tool carrier into interdigital engagement with serrated teeth in the main body of the device, thereby clamping the carrier in the main body.

The most pertinent prior art known to the applicant is the Stuber Pat. No. 2,423,419 and the Cyr Pat. No. 2,916,804. In both of these patents coacting serrated teeth on a wedge and the tool carrier are utilized to prevent motion of the wedge relative to the carrier while the combined wedge and carrier is forced into a cavity containing walls inclined toward each other, thereby captivating the carrier and the wedge. In both of these patents the carriers can be adjusted in the axial direction only.

In the present invention the interdigital cooperation of the serrated teeth, which may be referred to as multiple cam surfaces, in the main body, carrier, and wedge provides a track or channel for guiding or locating the carrier and the wedge relative to the main body. The clamping forces are developed by the movement of the wedge relative to the carrier. This device allows the carrier to be moved both radially and axially before it is clamped to the main body.

DESCRIPTION OF THE INVENTION

This invention relates to improvements in rotary cutting devices and more particularly to a device in which the cutting blades are adjustable.

A principal object of this invention is to provide a rotary cutting device in which the tool carrier can be adjusted both radially and axially with respect to the main body of the device.

Another object of this invention is to provide a means of axially and radially biasing unidirectionally a tool carrier so that it can be readily attached to and removed from the main body of a rotary cutting device.

Another object of this invention is to provide a rotary cutting device with removable tool carriers which is less expensive to manufacture, assemble, and service than most other similar devices.

Another object of the invention is the provision of a blade and wedge construction in which the entire assembly can be inserted into a relatively narrow slot in a tool body, thus making it possible to have a large number of cutting edges in a body where this is desired and also leaving more metal in the cutter body for strength between the blades. An important feature of the structure is the possibility of making a number of grinds on the cutting blade because of the possibility of outward movement as the blade wears.

Other objects and features of this invention will be apparent from the following description and claims in which there is found the manner of making and using the invention and best mode contemplated by the inventor for carrying out the invention.

Drawings accompany the disclosure and the various views thereof may be briefly described as:

FIG. 1, a side view of a portion of a rotary cutting device.

FIG. 2, a sectional view on line 2—2 of FIG. 1.

FIG. 3, a side view of a portion of a rotary cutting device showing the position of the tool carrier depicted in FIG. 1 after it has been shortened by sharpening of the tool.

FIG. 4, a side view of a portion of a rotary cutting device showing the position of the tool carrier after further sharpening of the tool depicted in FIG. 3.

FIG. 5, an enlarged side view of a portion of a cutter showing in detail the relationship of the blade and the wedge to the cutter body recess.

Referring to the drawings:

In FIG. 1, a rotary tool cutter main body 10 having a plurality of essentially rectilineal recesses 12 spaced about its periphery is shown. A tool carrier 14 having at least one surface area which is provided with a plurality of serrated teeth 16 is captivated in each rectilineal recess 12 by a wedge 18 provided with a plurality of serrated teeth 20. The rectilineal recess 12 has at least one depending wall formed with a plurality of serrated teeth 21 which are positioned to coact with the serrated teeth 16, 20 of the tool carrier 14 and the wedge 18.

At best shown in FIG. 2, the carrier 14 has an edge surface area 22 which is inclined with respect to the general direction of the knife edges of the serrated teeth 16 of the tool carrier. Likewise, the wedge 18 contains an edge surface area 24 which is inclined with respect to the serrated teeth 20 of the wedge 18. The serrated teeth of the tool carrier 14 and of the wedge 18 interdigitally cooperate with the serrated teeth of the main body so that when the wedge 18 is forced to the left (as shown in FIG. 2) the wedge surface area 24 bears on the carrier surface area 22 so that the tool carrier 14 is biased unidirectionally radially outward and axially to the left (as shown in FIG. 2). This action provides a means of clamping or securing the tool carrier 14 to the main body 10 by forcing it into engagement with wall 25 and the serrated teeth 21 of the rectilineal recess 12.

The serrated teeth 21 can be positioned so that they are either parallel or inclined with respect to the axis of rotation of the main body 10. In the preferred embodiment of this device the serrated teeth 21 are machined parallel to the axis of rotation of the main body 10, because both the rectilineal recess 12 and the serrated teeth 21 can be machined in one pass, thereby reducing the cost of manufacturing this device. The unidirectional axial and radial "clamping forces" of the carrier 14 and the wedge 18 are developed because the surface edges 22, 24 are inclined with respect to the knife edges of the serrated teeth 16, 20; therefore, the angular relationship of the serrated teeth 21 in the depending wall of the rectilineal recess 12 to the axis of rotation of the main body 10 is immaterial to the development of these "clamping forces." The unidirectional "clamping forces" resist the tendency of the carrier to move radially inward and axially away from the surface of the workpiece which is being machined.

The angular relationship of the surface edges 22, 24 to the serrated teeth 16, 20 is such that the tool carrier 14 and the wedge 18 are self-locking. A suitable angle of inclination between the edges 22, 24 and their respective serrated teeth 16, 20 for the purpose of providing a self-locking action is 6°.

It is considered to be obvious that this device could be constructed with two sets of serrated teeth 20, 21, 16 with one set being positioned on each depending wall of the rectilineal recess 12 and the corresponding surface areas on the tool carrier 14 and wedge 18. Also the tool carrier 14 could be formed as a part of a solid tool bit rather than containing a tool blade 26 suitably attached to the carrier 14.

As shown in FIGS. 3 and 4, the tool carrier 14 can be moved radially outward to compensate for the decreased length of the tool carrier 14 and the tool blade 26 which is caused by the sharpening of the tool blade 26. Thus, the tool carrier 14 can be adjusted both radially and axially with respect to the main body 10 to compensate for the sharpening of the tool blade 26 or to adjust the diameter of the rotary cutting device.

The tool bits in this device can be readily changed by moving the wedge to the right (as shown in FIG. 2) so that the tool carrier can be removed from the main body of the device. A new tool carrier is inserted into the main body so that the serrated teeth of the tool carrier interdigitally engage the serrated teeth of the main body and the wedge is forced to the left (as shown in FIG. 2), thereby locking or clamping the tool carrier to the main body.

In FIG. 5, the structure is shown enlarged from the showing of the previous figures to emphasize the importance of the action. The blade carrier 14 with the carbide insert 26 has a cutting edge 27 and it will be seen that the multiplicity of cam surfaces on the side of the tool carrier 14 away from the cutting edge 27 are in contact at the surfaces indicated at 30 and that actually there will be spaces 32 because of the fact that the blade is forced upwardly and toward the wall 25. Thus, it will be seen that the blade is being forced toward the cutting load.

In contrast, it will be noted that the wedge 18 is in contact at the surfaces 34, this being urged downwardly and toward the wall 25 while it exerts the upward force on the insert 14. Thus, the wedge is urging the insert 14 upwardly and at the same time urging the walls on either side of the recess in opposite directions to take up any slack in the body itself. The cam surfaces 30 are preferably at about a 45° angle so that the insert has a resultant force which is in the direction of the cutting forces exerted on the insert.

It will be noted that because of the thinness of the overall assembly that a large number of slots can be put in a cutter body, thus making it possible for each blade to carry a small cutting load and still permit a fast removal of metal. This allows more solid metal in the web between the blades which makes for a stronger cutter body and of course the blade can be ground many times as indicated in the difference between the blade shown in FIG. 3 and the blade shown in FIG. 4.

What is claimed as new is as follows:
1. A cutting device comprising:
    (a) a main body containing one or more essentially rectilineal recesses with at least one depending wall of the recess containing a plurality of cam surfaces,
    (b) a tool insert having at least one surface area with a plurality of cam surfaces positioned for interdigital cooperation with the surfaces of a recess in the main body,
    (c) a means of selectively biasing the insert unidirectionally outwardly and endwise with respect to the main body, comprising a wedge containing a plurality of cam surfaces positioned for interdigital cooperation with the surfaces of the main body and at least one edge surface area inclined to the cam surfaces of the wedge and positioned to bear on the insert, so that the wedge edge surface area engages and biases the insert,
        whereby the location at which the insert is clamped to the main body can be varied both outwardly of the recess and endwise of the insert.
2. In a cutting device comprising a main body having one or more recesses for receiving a cutting insert, a wedge for holding a cutting insert in a recess in said device comprising a body having at least one surface provided with a plurality of parallel serrated teeth for interengagement with complementary teeth in said device, and at least one edge surface inclined to the direction of said serrated teeth wherein said wedge may lie against and bias an insert while supported by said serrated teeth.
3. A cutting device comprising:
    (a) a main body having a plurality of spaced recesses opening at the outside of the body with at least one wall of each of the recesses adjacent the opening being provided with a plurality of parallel, straight cam surfaces,
    (b) a tool carrier in each of the recesses having a cutting means positioned to project from the body and having at least one surface area provided with a plurality of cam surfaces for interdigital cooperation with the surfaces of the body, and
    (c) a wedge means positioned in each of the recesses below each of the tool carriers and having a plurality of parallel, straight cam surfaces formed along at least one surface thereof to provide support for each of the wedge means in each of the recesses, the wedge means and the tool carrier having adjacent contacting surfaces disposed at an angle to the longitudinal direction of the cam surfaces,
    whereby the tool carriers are urged outwardly of the recesses while retained therein in any of a plurality of adjusted positions by the cooperation of the cam surfaces of the recess wall and the tool carrier, and the wedge provides a retaining force as well as supporting the carriers from the bottom.

References Cited

UNITED STATES PATENTS

| | | | |
|---|---|---|---|
| 1,898,800 | 2/1933 | Whitman | 29—105 |
| 2,037,642 | 4/1936 | Scribner | 29—105 |
| 2,173,848 | 9/1939 | Kraus | 29—105 |
| 2,173,868 | 9/1939 | Weddell et al. | 29—105 |
| 2,240,360 | 4/1941 | Whitman | 29—105 |

HARRISON L. HINSON, Primary Examiner